United States Patent Office 3,191,743
Patented June 29, 1965

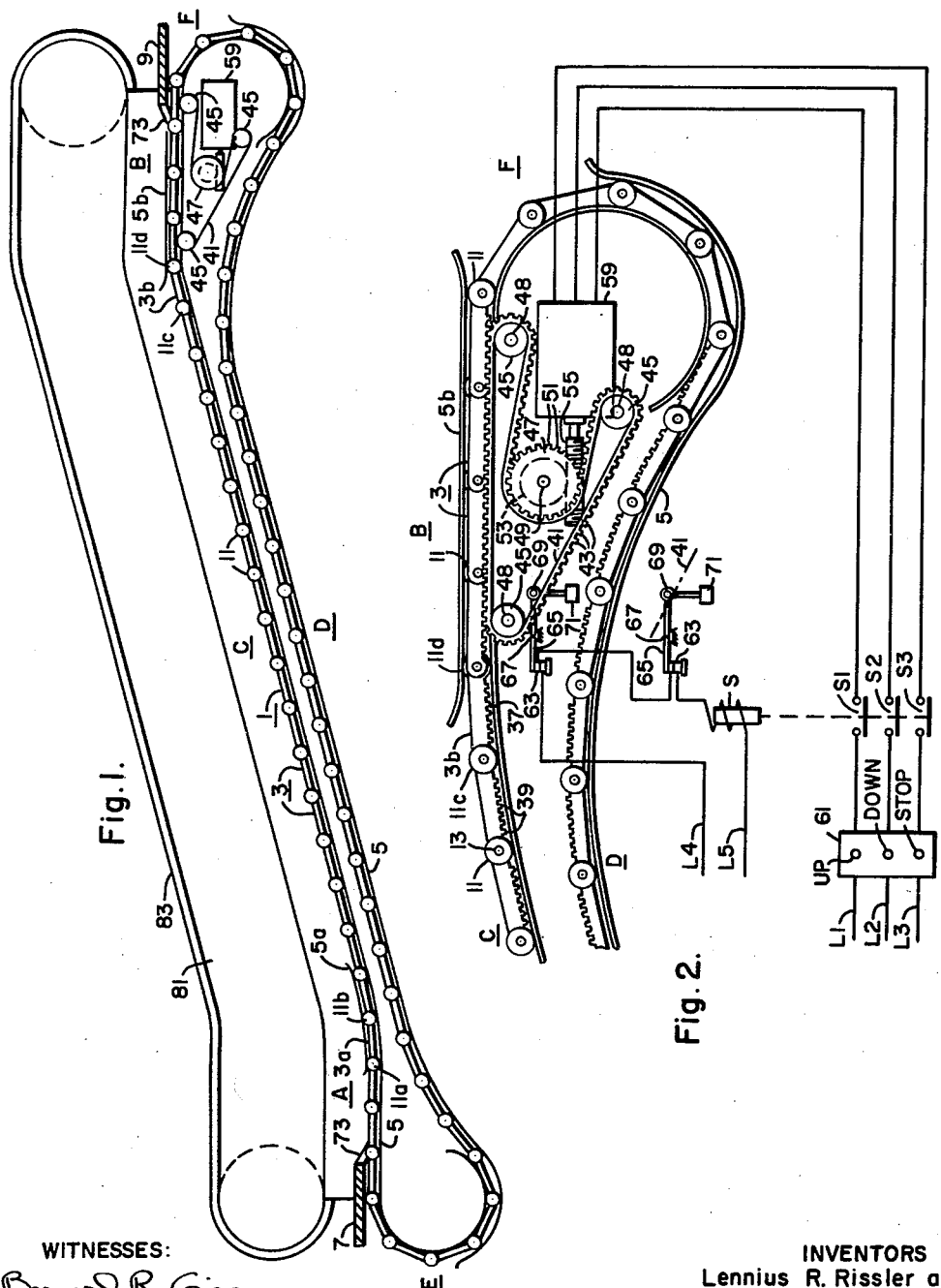

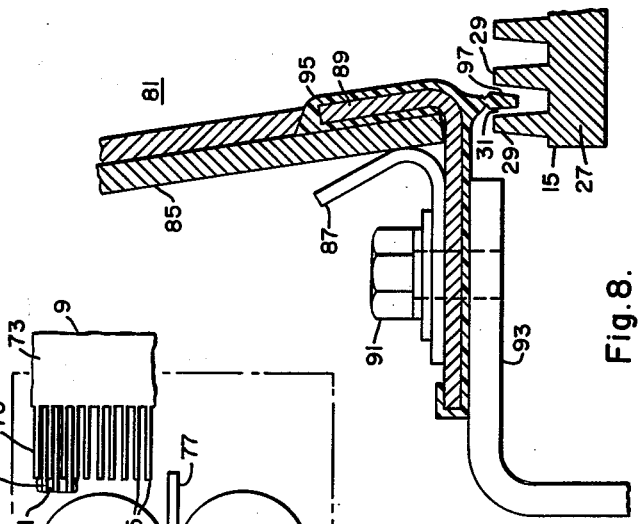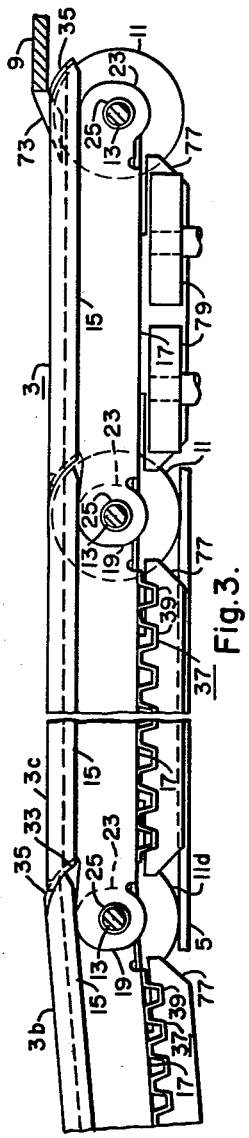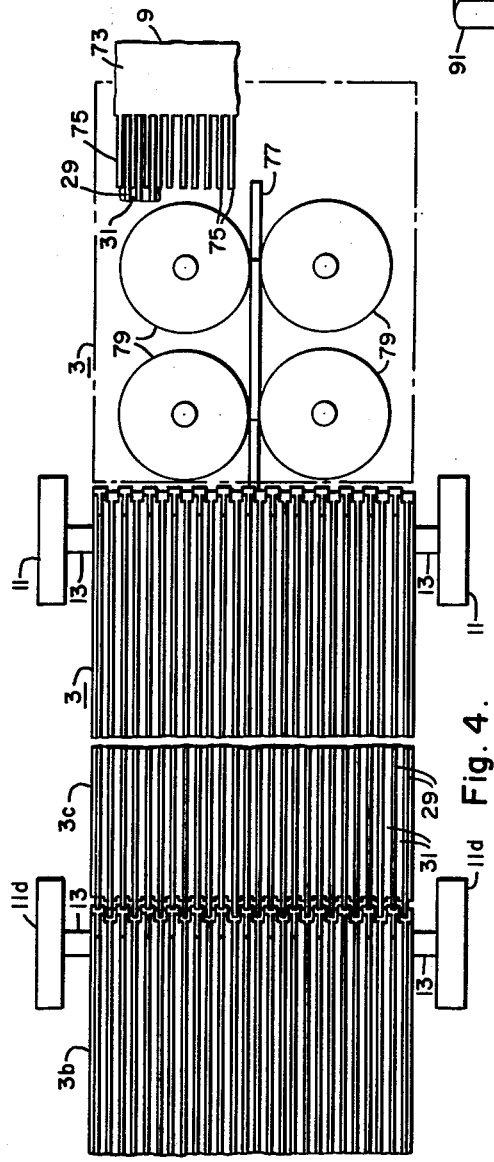

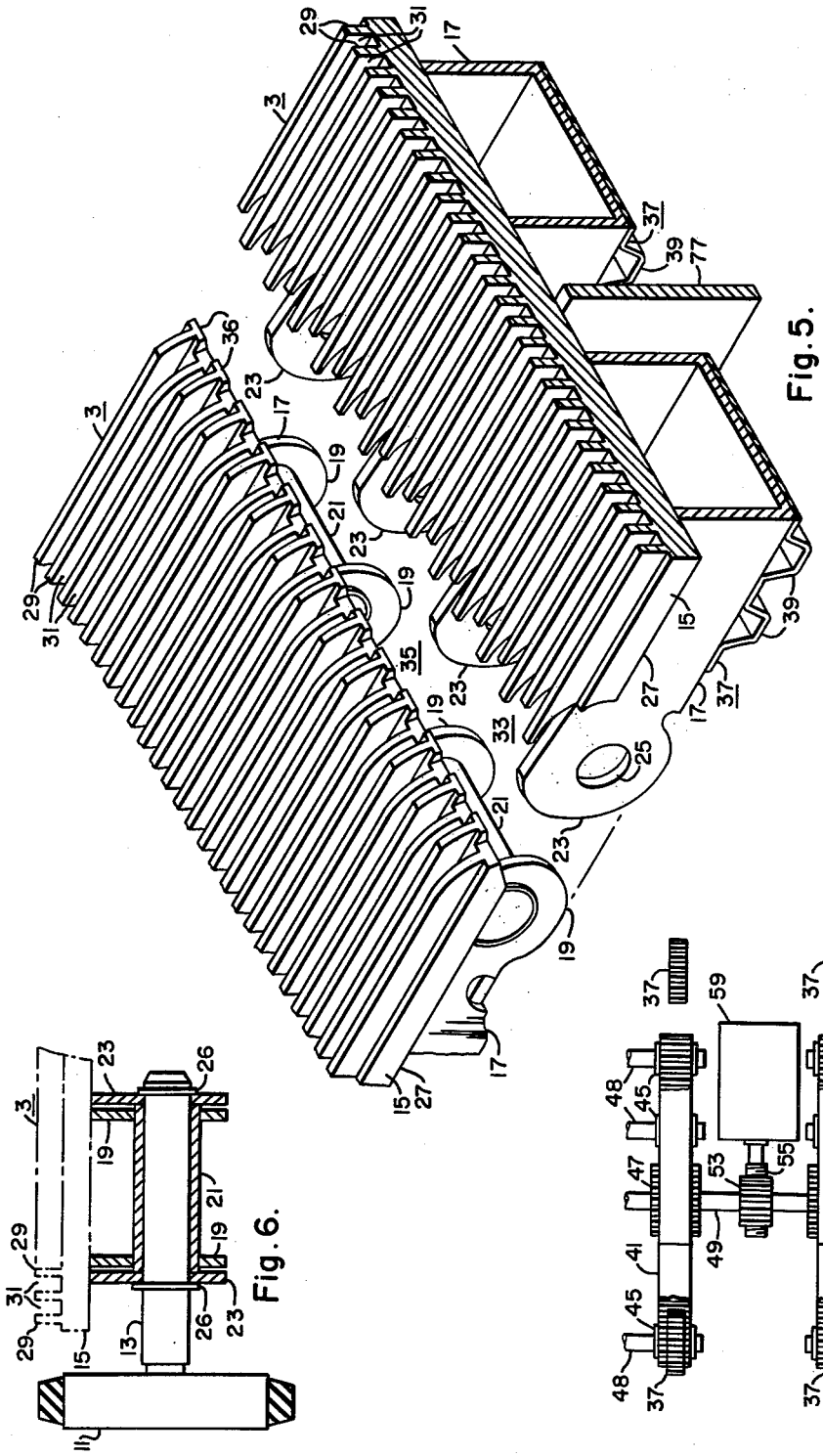

3,191,743
MOVING WALK
Lennius R. Rissler, Ho-Ho-Kus, and Clyde M. Mullis, Glen Rock, N.J., assignors to Westinghouse Electric Corporation, East Pittsburgh, Pa., a corporation of Pennsylvania
Filed June 6, 1962, Ser. No. 200,499
27 Claims. (Cl. 198—16)

This invention relates to moving walks and it has particular relation to moving walk belts.

This application is a continuation-in-part of application Serial No. 135,488, filed September 1, 1961, now abandoned, by the same inventors and assigned to the same assignee.

A moving walk may employ a continuous moving belt for conveying passengers from a first to a second landing. If the landings are spaced both horizontally and vertically, it is desirable for the passenger transporting run of the belt to comprise a horizontal portion immediately adjacent each of the landings with an inclined portion joining the horizontal portions. While the belt may be continuous and constructed of an elastomer such as rubber, conveniently it may be articulated, i.e., constructed of an endless series of rigid segments or platforms.

In accordance with the invention, a moving walk belt comprising an endless series of similar platforms is constructed so that the treadway of the belt may follow a course whose load transporting run includes any desired combination of horizontal and inclined portions. In a preferred embodiment of the invention, each of the platforms is substantially rectangular in shape, and adjacent platforms are supported in common by a pair of rollers disposed for rotation about a common axis extending transversely to the direction of movement of the belt. Suitable guides in the form of tracks are provided for the rollers in order to move the belt in the desired path.

For maintaining the gap between adjacent platforms at a minimum during the travel thereof throughout the load transporting run of the belt, the adjacent end portions of such platforms are curved about the axis of rotation of the associated pair of rollers, one of such end portions overlapping the other. Such construction greatly reduces the possibility of the insertion of objects between adjacent platforms.

Each platform desirably has a plurality of cleats and grooves therebetween extending in the direction of belt movement for supporting load, the cleats being aligned with those of each of the other platforms. For further reducing the possibility of the insertion of objects between adjacent platforms, the end portions of the cleats thereof may be configured to intermesh with each other. In addition, the cleats intermesh with the teeth of a comb plate disposed at each moving walk landing to facilitate the smooth transfer of load to and from the belt at the landings. Separate guide means adjacent each of the landings are provided for assuring the accurate mesh of the platform cleats and the comb plate teeth.

In a preferred embodiment of the invention, the load transporting belt is moved by means of a pair of transversely spaced toothed racks secured to the underside of each of its platforms. Disposed within the loop of the load transporting belt is a pair of similarly spaced flexible drive belts, each having teeth intermeshing with the teeth of the racks of a plurality of the platforms. The flexible belts, in turn, are driven by suitable motive means such as a reversible electric motor. Means are provided for interrupting the power circuit of the motor in the event of breakage of either or both of the drive belts.

In order to impart the best qualities to the components from the standpoint of wear and quietness of operation, the platforms and their associated racks preferably are fabricated of metal, while the drive belts preferably are formed of a resilient material such as rubber.

A handrail operating in synchronism with the moving platforms may be provided at each side of the walk, to be grasped by passengers during their travel on the walk. Each handrail is associated with a balustrade, beneath which extends a side portion of each of the platforms. For closing the gap between each balustrade and the platforms, the bottom of the former has a covering of resilient or flexible material. The covering is provided with a lip which extends into a groove between two adjacent cleats of each platform, thus preventing the insertion of objects between the platforms and the bottom of the balustrade.

It is, therefore, an object of the invention to provide an improved moving walk including an articulated load transporting belt comprising an endless series of similar rigid platforms adapted to follow a path including any desired combination of horizontal and inclined portions.

It is a further object of the invention to provide a moving walk as defined in the preceding paragraph in which adjacent platforms are mounted for rotation about a common axis extending transversely to the direction of movement of the belt.

It is an additional object of the invention to provide a moving walk as defined in the preceding object wherein such adjacent platforms are supported in common by a pair of rollers mounted for rotation about such common axis.

It is another object of the invention to provide a moving walk as defined in any of the preceding objects in which an end portion of each platform overlaps the adjacent end portion of the adjacent platform in order to minimize the gap therebetween throughout the load transporting run of the belt.

It is also an object of the invention to provide a moving walk as defined in any of the preceding objects with improved platform driving means comprising a toothed metallic rack secured to each of the platforms and a resilient drive belt having teeth intermeshing with the teeth of a plurality of such platform racks.

It is still another object of the invention to provide a moving walk as defined in any of the preceding objects wherein each platform has cleats for intermeshing with the teeth of a comb plate disposed at each walk landing.

It is an additional object of the invention to provide a moving walk as specified in the preceding paragraph with a moving handrail and a supporting balustrade therefor, the balustrade being provided with a flexible lip for closing the gap between the upper surface of each platform and the bottom of the balustrade.

Other objects of the invention will be apparent from the following discussion taken in conjunction with the accompanying drawings, in which:

FIG. 1 is a view in side elevation, with parts broken away and parts omitted, of a moving walk embodying the invention;

FIG. 2 is an enlarged side elevation, with parts broken away and parts not shown, of the upper end of the moving walk of FIG. 1, together with electrical control circuits in schematic form;

FIG. 3 is an enlarged view in side elevation, with parts not shown and parts broken away, of a portion of the moving walk of FIG. 1;

FIG. 4 is a top plan view of the portion of the moving walk illustrated in FIG. 3;

FIG. 5 is an enlarged isometric view, with parts in section, illustrating details of construction of the platforms of the moving walk of FIG. 1;

FIG. 6 is an enlarged fragmentary view illustrating the relation of two adjacent platforms and an associated roller of the moving walk of FIG. 1;

FIG. 7 is a top plan view, with parts broken away and parts not shown, of the moving walk motive means illustrated in side elevation in FIG. 2; and FIG. 8 is an enlarged view, with parts in section, parts broken away and parts not shown, illustrating the association of balustrade components and an adjacent moving walk platform.

Referring to FIG. 1, illustrated therein is a moving walk which includes a continuous articulated belt 1 comprising an endless series of substantially identical, generally rectangular, rigid pallets or platforms 3 disposed to be moved along guides or tracks 5, which may be supported by a suitable truss (not shown). The belt 1 has an upper or passenger transporting run extending between a lower landing 7 and an upper landing 9. The passenger or load transporting run comprises a lower horizontal portion A adjacent the lower landing 7, an upper horizontal portion B adjacent the upper landing 9 and a portion C which joins the horizontal portions and which may be inclined at an angle relative to the horizontal of the order of 15 degrees. The belt 1 also has a lower or return run D and a pair of arcuate end runs E and F, the latter of which constitute transitions between the passenger transporting and return runs.

Adjacent ones of the platforms 3 are supported in common by a pair of outwardly disposed wheels or rollers 11 (FIG. 4) which are mounted for rotation about a common axis by means of a pair of longitudinally aligned stub axles 13, respectively. The rollers 11, in turn, are supported by the tracks 5 for guiding the platforms 3 in the desired path.

Turning to FIGS. 3, 5 and 6, each platform includes a treadboard 15 and a pair of spaced platform and roller support links 17, a separate one of which is disposed adjacent each side of the treadboard. The corresponding links of each treadboard are aligned longitudinally with each other. Preferably, the treadboards and links are fabricated of metal. For example, the treadboards may be formed of aluminum which is die-cast to the desired shape, while the links may be constructed of sheet steel. The links 17 may be secured to the treadboards 15 by any suitable means such as bolting or welding.

Each of the links 17 has a generally channel or U-shaped configuration. The end portions of the links form supports for the roller axles 13. Thus, at one end of each link is a pair of spaced end portions 19. Associated with each of these pairs of end portions is a suitable bushing or bearing 21 which is inserted through respective apertures in the end portions to bridge the space therebetween. The bushings may be secured to the links as by means of welding. It will be noted that each end of each bushing 21 projects slightly beyond the outer face of the adjacent link end portion 19.

At the opposite end of each support link 17 is a pair of end portions 23, each having an aperture 25. As is clearly shown in FIG. 6, the end portions 23 of each link are spaced by a distance which is somewhat greater than the spacing between the opposite end portions 19, so that the former may overlap the latter. Preferably, the spacing between the end portions 23 of each link is substantially equal to the length of each of the bushings 21.

For assembling each of the rollers 11 to a pair of adjacent platforms 3, the apertures in the associated support link end portions 23 of one of such platforms are aligned with the aperture in the bushing 21 secured to the end portions 19 of the corresponding support link of the other of such platforms. The roller axle 13 then is inserted through the aligned apertures, and a pair of split retaining rings 26 are applied to the axle adjacent the link end portions 23. For this purpose, the axle may have two peripheral grooves (not shown) into which the retaining rings may be inserted. Preferably, at least one of the end portions 23 is keyed to the axle 13 in a conventional manner. The bushing 21 has a slightly larger inside diameter than the outside diameter of the axle 13.

Thus, adjacent platforms are rotatable relative to each other about the axis of rotation of the associated pair of rollers 11.

It will be appreciated that the foregoing association of the platforms 3, the axles 13 and the rollers 11 permits the platforms to follow precisely the desired course as determined by the tracks 5. In order to prevent the rollers and their respective associated platforms from rising from the tracks 5 during transition of the belt 1 between its load transporting run lower horizontal portion A and its inclined portion C, a relatively short auxiliary upper track section 5a (FIG. 1) is provided at each side of the belt adjacent the aforesaid transition for engaging the upper portions of the rollers as they pass thereunder.

The treadboard 15 of each platform 3 includes a body or base portion 27 which carries a plurality of parallel cleats 29 spaced to form grooves 31 therebetween extending in the direction of movement of the platform. The cleats and grooves of each of the platforms are aligned longitudinally with the cleats and grooves of each of the other platforms. Preferably, the cleats 29 extend to a uniform height from the bodies 27.

The dimensions of the treadboard cleats and grooves preferably are such that loads to be transported by the belt 1 will be supported adequately by the cleats on the top surfaces thereof. For example, each of the cleats 29 may have a width of the order of ⅛ inch, while each of the grooves 31 may have a width of the order of ¼ inch, the cleat pitch, therefore, being of the order of ⅜ inch.

The opposite end portions of each platform treadboard 15 are configured so that one end portion of each treadboard overlaps the adjacent end portion of the adjacent treadboard, as viewed from above, during travel of the plaftforms 3 throughout the passenger transporting run of the belt 1 between the landings 7 and 9. For this purpose, the treadboard of each platform has opposite generally cylindrical end portions, i.e., each treadboard has a generally concave end portion 33 and an opposite generally convex end portion 35, each of which extends from side to side of the associated treadboard.

It will be observed that the ends of the treadboard cleats 29 are staggered and that each end of each treadboard base 27 comprises teeth 36 spaced to form notches therebetween. The cleat ends and the base teeth and notches are curved in a manner such that each cleat end merges smoothly into its associated base tooth or notch, as the case may be.

Preferably, the axis of curvature of the cleat ends and the base teeth and notches of each treadboard end portion is coincident with the axis of rotation of that pair of rollers 11 associated with such end portion. The roller tracks 5 are configured and the treadboard cleat ends and base teeth are dimensioned so that adjacent cleat ends and base teeth of adjacent treadboards intermesh during travel of the platforms 3 throughout the passenger transporting run of the belt 1 between the landings 7 and 9. The clearance between adjacent treadboard concave and convex end portions 33 and 35 may be held to a minimum consistent with practical design considerations, being sufficient to prevent interference between adjacent treadboards over the entire path of travel of the platforms.

Let it be assumed that the platforms 3 are moving in a generally clockwise direction, as viewed in FIG. 1, in order to convey passengers from the lower landing 7 to the upper landing 9. During transition of the platform 3a from the load transporting run lower horizontal portion A to the inclined portion C, the platform rotates in a counterclockwise direction about the axis of rotation of the rollers 11a, at the same time rotating in a clockwise direction about the axis of rotation of the rollers 11b. Similarly, during transition of the platform 3b from the inclined portion C to the upper horizontal portion B, such platform rotates in a counterclockwise direction about the axis of rotation of the rollers 11c and in a clockwise direction about the axis of rotation of the rollers 11d. It will be apparent that corresponding rotations occur when the platforms move in the opposite direction to convey passengers from the upper landing 9 to the lower landing 7.

As a result of the curvature of each of the treadboard end portions 33 and 35 and the overlapping of each of the convex end portions 35 by the adjacent concave end portion 33, it will be observed that a constant minimum gap is maintained between adjacent platforms during travel thereof throughout the load transporting run of the belt 1, and more particularly during transition of the platforms between each of the horizontal portions A and B and the inclined portion C. Such overlap together with the accompanying meshing of the treadboard cleats and base teeth substantially eliminates the possibility of insertion of objects between adjacent platforms. In the absence thereof, however, it will be appreciated that an objectionable gap of substantial and varying proportions would exist between adjacent platforms. (In the top plan view of FIG. 4, the spacings between the treadboard cleats and the base teeth of the platform 3b and the respective corresponding parts of the platform 3c are exaggerated for the purpose of clarity.)

For driving the platforms 3, a rack 37 fabricated of metal such as steel, comprising a substantial number of teeth 39 and being of substantial length relative to its associated treadboard is secured by any suitable means, as by bolting or welding, to the bottom of each of the support links 17, as viewed in FIGS. 3 and 5. Each of the teeth 39 conveniently may extend from side to side of the associated support link.

Referring to FIGS. 1, 2 and 7, disposed within the loop of the belt 1 at the upper end thereof is a pair of continuous flexible drive belts 41 each having teeth 43 on its outer surface which are configured to intermesh with the teeth 39 of the racks 37. Preferably, the belts 41 are fabricated of a resilient material, for example, an elastomer such as rubber, which conveniently may be reinforced in a conventional manner with steel strands. It will be noted that the orientation of the belts 41 results in forces exerted by the belts on the racks 37 and thus on the platforms 3 having components acting not only in the direction of movement of the platforms, as desired, but also relatively smaller components acting vertically upward. In order to prevent the rollers 11 and their respective associated platforms from rising from the tracks 5 as a result of the latter forces, an auxiliary upper track section 5b is provided at each side of the belt 1 adjacent the toothed drive belts 41 for engaging the upper portions of the rollers 11 as the platforms pass over the drive belts.

Each of the drive belts 41 is trained around three idler pulleys 45 and a metallic gear 47. As is shown in FIG. 7, each of the pulleys 45 is mounted for rotation about its axis by means of a shaft 48, while the gears 47 are secured to a common shaft 49 for rotation about a common axis. The shafts 48 and 49 may be supported by the moving walk truss. Each of the gears 47 has circumferential teeth 51, which are adapted to intermesh with the teeth 43 of the associated drive belt 41. For each of the belts, the associated pulleys 45 and gear 47 are spaced to maintain the belt in an extended condition; and the upper two of such pulleys, as viewed in FIGS. 1 and 2, are spaced sufficiently to permit the teeth 43 of the belt to intermesh with the teeth 39 of a plurality of the racks 37, such as three racks. In this manner, the force exerted on each of the rack teeth 39 and drive belt teeth 43 is maintained at a safe value.

The toothed belt driving gears 47 are rotated by means of a worm wheel 53 secured to their shaft 49 for rotation therewith. The wheel 53, in turn is driven by a worm 55 secured to the output shaft of a motor 59. The motor may be connected for energization to a suitable three-phase source of electric power (not shown) by means of buses L1, L2 and L3 (FIG. 2), thereby effecting movement of the toothed belts 41 to drive the moving walk platforms 3 in the desired path.

The buses L1, L2 and L3 are connected to a conventional control unit 61, which has an Up push button for effecting movement of the platforms 3 in a clockwise direction, as viewed in FIGS. 1 and 2, a Down push button for causing the platforms to move in a counterclockwise direction and a Stop push button for terminating movement of the platforms. The output conductors of the control unit 61 respectively are fed through make contacts S1, S2 and S3 of a safety relay S to the motor 59.

The coil of the safety relay S is connected for energization from a suitable source of electric power (not shown) by means of buses L4 and L5. In FIG. 2, it is assumed that these buses are in deenergized condition. It will be noted that the bus L5 is connected directly to one end of the coil, while the bus L4 is connected to the opposite end of coil through two sets of serially-connected, mechanically-operated contacts 63, each of the sets being associated with a separate one of the toothed drive belts 41 and being adapted to detect a break in such belt. Thus, each set of contacts 63 may include a stationary contact and a movable contact which normally are closed to permit energization of the coil of the safety relay therethrough. The movable contact of each set is connected to one end of an operating arm 65, which is rotatable about a pivot 67. Connected to the opposite end of each arm 65 is a roller 69 which rides on the inside surface of the associated toothed belt 41. Each of the rollers 69 may be biased in a downward direction, as viewed in FIG. 2, by any suitable means such as by a weight 71.

By virtue of the foregoing arrangement, it will be apparent that as long as the continuity of both of the toothed drive belts 41 is maintained, the coil of the safety relay S may be energized through the contacts 63 from the buses L4 and L5 to close its make contacts S1, S2 and S3, thus permitting the motor 59 to be energized from the buses L1, L2 and L3 for driving the moving walk belt 1. Should either of the toothed belts 41 break for any reason, however, the associated weight 71 will effect rotation of the associated contact arm 65 in a clockwise direction about its pivot 67 to open the corresponding set of contacts 63. As a result, the safety relay S is deenergized and drops out to open its make contacts S1, S2 and S3, thus interrupting energization of the motor 59 and terminating movement of the moving walk belt 1.

At each of the landings 7 and 9 is disposed a comb or comb plate 73 (FIGS. 1, 3 and 4). Each of the comb plates 73 has a plurality of tapered fingers or teeth 75 which are received in the platform grooves 31 to intermesh with the cleats 29 thereof. Desirably, each of the comb plate teeth 75 is tapered to rise from a position wholly within its associated platform groove 31 to a position above the platform cleats 29, as is clearly illustrated in FIG. 3.

A centrally-disposed, longitudinally-extending guide bracket or vane 77 (FIGS. 3, 4 and 5) is secured by any suitable means, such as by bolting or welding, to the underside of each of the platform treadboards 15. In front of and beneath each of the comb plates 73 are at least one pair and preferably two pairs of guide rollers 79, which are mounted on the moving walk truss for rotation about their respective axes. (For simplicity, only the rollers adjacent the upper landing 9 are shown.) The rollers of each pair are spaced by a distance substantially equal to the thickness of each of the guide vanes 77. Thus, the platform cleats 29 are guided by means of the vanes 77 and the rollers 79 into accurate mesh with the comb plate teeth 75 at each of the landings 7 and 9.

Let it be assumed that the motor 59 is energized so that the belt 1 moves in a direction to transport load from the lower landing 7 to the upper landing 9 and that a passenger is disposed on one of the platforms 3 and is, therefore, being transported toward the landing 9. When the passenger, moving horizontally, arrives at the landing 9, he will be transferred smoothly thereto, as his feet contact the comb plate teeth 75 and the belt continues to move, due to the combing action of the comb plate teeth with the platform cleats 29 on which the passenger is disposed. Thus, the passenger is deposited on the landing 9 to a position clear of the belt, although he has not actually stepped from the belt onto the landing. If the direction of belt travel is reversed, i.e., if the motor 59 is energized so that the belt 1 moves in a direction to transport load from the upper landing 9 to the lower landing 7, operation of the platform cleats and comb plate teeth with respect to the smooth transfer of load from the belt 1 to the landing 7 is identical to the operation described above for the landing 9.

Referring to FIG. 1, a balustrade 81 is disposed at each side of the load transporting run of the belt 1. Associated with each balustrade in an endless handrail 83 which is moved in synchronism with the platforms 3 in a manner well understood in the art.

Turning now to FIG. 8, each of the balustrades 81 comprises a panel 85. The panel is positioned accurately by means of a bracket 87 and a support strip 89, which are mounted by bolts 91 on a supporting member 93, the latter of which may be secured to the moving walk truss. It will be noted that a side portion of each of the platform treadboards 15 extends beneath the balustrade. Desirably, the space between the support strip 89 and the threadboards 15 is maintained at a minimum. It will be appreciated, however, that the space between the support strip and the tops of the adjacent treadboard cleats 29 varies during transition of the treadboards between the moving walk horizontal portions A and B and inclined portion C (FIG. 1).

In order to close the gap between the balustrade and the platform treadboards, the support strip 89 is provided with a covering 95 extending from the bottom landing to the top landing of the moving walk. The covering 95 preferably is formed of a resilient or flexible material such as rubber or nylon which may be extruded or molded to the desired shape. The covering has a lip 97 which meshes with two adjacent cleats 29 of each treadboard by extending into the groove 31 therebetween. Consequently, the lip 97 prevents the insertion of objects between the treadboards and the bottom of the balustrade 81. Conveniently, the lip 97 is constricted near the main body portion of the covering 95 to effect a hinge-like action of that portion of the lip which meshes with the cleats 29.

Trim molding 99 may be provided at the top of the covering 95. The bottom of the trim molding may conform to the shape of the top of the covering 95.

Although the invention has been described with reference to certain specific embodiments thereof, numerous modifications falling within the spirit and scope of the invention are possible. Consequently, the specific embodiments herein disclosed are to be interpreted in an illustrative rather than in a limiting sense.

We claim as our invention:

1. In a conveyor for carrying load, a structure having first and second spaced landings, an articulated belt having a load transporting run and a return run, motive means for moving the belt in a closed path with said load transporting run extending between said landings, said belt comprising an endless series of substantially identical rigid platforms including first and second adjacent platforms having adjacent respective end portions extending between the sides of the associated platform, means mounting said first and second adjacent platforms for independent rotation about a common horizontal axis extending transversely to the direction of movement of said belt, and a pair of rollers each disposed outwardly of a separate side of and mounted for rotation about said axis for common support of said first and second adjacent platforms, said end portion of said first platform being concavely curved about said axis, said end portion of said second platform being convexly curved about said axis, said curved end portion of said first platform overlapping said adjacent curved end portion of said second platform throughout the movement of said first and second platforms between said landings on said load transporting run.

2. In a moving walk for carrying passengers, a structure having a first landing and a second landing horizontally and vertically spaced from the first landing, an articulated belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of substantially identical rigid platforms including first and second adjacent platforms having adjacent respective end portions extending between the sides of the associated platform, said end portion of said first platform being concavely curved about a horizontal axis extending transversely to the direction of movement of said belt, said end portion of said second platform being convexly curved about said axis, and means common to said first and second adjacent platforms mounting such platforms adjacent said adjacent end portions for movement in said path and for rotation of said first platform relative to said adjacent second platform about said axis during transition of said first and second platforms between each of said passenger transporting run horizontal portions and said passenger transporting run inclined portion, said curved end portion of said first platform overlapping said adjacent curved end portion of said second platform throughout the movement of such platforms between said landings on said passenger transporting run.

3. In a moving walk for carrying passengers, a structure having a first landing and a second landing horizontally and vertically spaced from the first landing, an articulated belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of subtantially identical rigid platforms including first and second adjacent platforms having adjacent respective end portions extending between the sides of the associated platform, said end portion of said first platform being concavely curved about a horizontal axis extending transversely to the direction of movement of said belt, said end portion of said second platform being convexly curved about said axis, and means common to said first and second adjacent platforms mounting such platforms adjacent said adjacent end portions for movement in said path and for rotation of said first platform relative to said adjacent second platform about said axis during transition of said first and second platforms between each of said passenger transporting run, horizontal portions and said passenger transporting run inclined portion, said curved end portion of said first platform overlapping said adjacent curved end portion of said second platform throughout the movement of such platforms between said landings on said passenger transporting run, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats.

4. In a moving walk for carrying passengers, a structure having a first landing and a second landing horizontally and vertically spaced from the first landing, an articulated belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of substantially identical rigid platforms including first and second adjacent platforms having adjacent respective end portions extending between the sides of the associated platform, a pair of rollers for common support of said first and second adjacent platforms, axle means mounting said rollers on such platforms adjacent said adjacent end portions for rotation about a common horizontal axis extending transversely to the direction of movement of said belt, one roller of said pair being disposed outwardly of one side of said belt, the other roller of said pair being disposed outwardly of the opposite side of said belt, said first and second adjacent platforms being independently rotatable about the axis of rotation of their associated pair of rollers, and track means for guiding said rollers to move said platforms in said path whereby said first platform rotates relative to said second platform about said axis of rotation during transition of said first and second platforms between each of said passenger transporting run horizontal portions and said passenger transporting run inclined portion, said end portion of said first platform being concavely curved about said axis, said end portion of said second platform being convexly curved about said axis, said curved end portion of said first platform overlapping said adjacent curved end portion of said second platform throughout the movement of such platforms between said landings on said passenger transporting run, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement about the adjacent cleats.

5. In a conveyor for carrying load, a structure having first and second spaced landings, an articulated belt comprising an endless series of similar platforms and having a load transporting run and a return run, and means for moving said articulated belt in a closed path with said load transporting run extending between said landings, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, a guide vane secured to the underside of each of said platforms during said load transporting run and extending in the direction of movement of the associated platform, each of said guide vanes being aligned longitudinally with the guide vane of each of the other platforms, and guide means for receiving said guide vanes to guide said platform cleats into accurate mesh with said comb plate teeth.

6. In a conveyor for carrying load, a structure having first and second spaced landings, an articulated belt comprising an endless series of similar platforms and having a load transporting run and a return run, and means for moving said articulated belt in a closed path with said load transporting run extending between said landings, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, a guide vane secured to the underside of each of said platforms during said load transporting run and extending in the direction of movement of the associated platform, each of said guide vanes being aligned longitudinally with the guide vane of each of the other platforms, and a pair of guide rollers disposed for rotation about their respective axis in front of and beneath said comb plate, said rollers being spaced to receive said guide vanes therebetween for guiding said platform cleats into accurate mesh with said comb plate teeth.

7. In a conveyor for carrying load, a structure having first and second spaced landings, an articulated belt having a load transporting run and a return run, motive means for moving the belt in a closed path with said load transporting run extending between said landings, said belt comprising an endless series of substantially identical rigid platforms including first and second adjacent platforms, means mounting said first and second adjacent platforms for independent rotation about a common horizontal axis extending transversely to the direction of movement of said belt, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, a guide vane secured to the underside of each of said platforms during said load transporting run and extending in the direction of movement of the associated platform, each of said guide vanes being aligned longitudinally with the guide vane of each of the other platforms, and a plurality of pairs of guide rollers disposed for rotation about their respective axes in front of and beneath said comb plate, the rollers of each pair being spaced to receive said guide vanes therebetween for guiding said platform cleats into accurate mesh with said comb plate teeth, two of said pairs of rollers being spaced apart in the direction of belt movement by a distance less than the length of each of said guide vanes.

8. In a conveyor for carrying load, a structure having first and second spaced landings, an articulated belt comprising an endless series of similar platforms and having a load transporting run and a return run, and means for moving said articulated belt in a closed path with said load transporting run extending between said landings, said means comprising a toothed rack secured to each of said platforms, an endless resilient belt having teeth intermeshing with the teeth of the racks of a plurality of said platforms for all operating positions of the platforms and the resilient belt, and motive means operable for driving said resilient belt.

9. In a conveyor for carrying load, a structure having a first and second horizontally spaced landings, an articulated belt comprising an endless series of similar platforms and having a load transporting run and a return run, and means for moving said articulated belt in a closed path with said load transporting run extending between said landings, said means comprising a rack secured to the underside of each of said platforms during said load transporting run, each of said racks comprising spaced teeth, each of said teeth extending horizontally and transversely to the direction of movement of the associated platform, an endless resilient belt disposed within the loop of said articulated belt and having teeth on the outer face of the resilient belt intermeshing with the teeth of the racks of a plurality of said platforms for all operating positions of the platforms and the resilient belt, and motive means operable for driving said resilient belt, said motive means including a gear positioned to intermesh with the teeth on the outer face of the resilient belt, said resilient belt being trained around the gear to increase the extent of the intermesh between the teeth on the resilient belt and the teeth on the gear.

10. In a conveyor for carrying load, a structure having first and second horizontally spaced landings, an articulated belt comprising an endless series of similar platforms and having a load transporting run and a return run, and means for moving said articulated belt in a closed path with said load transporting run extending between said landings, said means comprising a rack secured to the underside of each of said platforms during said load transporting run, each of said racks comprising a substantial number of spaced teeth, each of said teeth extending horizontally and transversely to the direction of movement of the associated platform, each of said racks being of substantial length relative to the lenth of its associated platform in the direction of movement thereof, an endless resilient belt disposed within the loop of said articulated belt and having teeth intermeshing with the teeth of the racks of a plurality of said platforms, said resilient belt being oriented to develop forces directed vertically upward on the last-named platforms, means for preventing said last-named platforms from rising vertically upward as a result of said forces, and motive means operable for driving said resilient belt.

11. In a conveyor for carrying load, a structure having first and second horizontally spaced landings, an articulated belt comprising an endless series of similar platforms and having a load transporting run and a return run, roller means supporting each of said platforms, track means for guiding said roller means, and motive means for moving said articulated belt in a closed path with said load transporting run extending between said landings, said motive means comprising a rack secured to the underside of each of said platforms during said load transporting run, each of said racks comprising spaced teeth, each of said teeth extending horizontally and transversely to the direction of movement of the associated platform, an endless resilient belt disposed within the loop of said articulated belt and having teeth intermeshing with the teeth of the racks of a plurality of said platforms, said resilient belt being oriented to develop forces directed vertically upward on the last-named platforms, auxiliary track means disposed to engage the upper portions of the roller means associated with said last-named platforms to prevent such platforms from rising vertically upward as a result of said forces, and means operable for driving said resilient belt.

12. In a conveyor for carrying load, a structure having first and second horizontally spaced landings, an articulated belt comprising an endless series of similar platforms and having a load transporting run and a return run, and means for moving said articulated belt in a closed path with said load transporting run extending between said landings, said means comprising a metallic rack secured to the underside of each of said platforms during said load transporting run, each of said racks comprising a substantial number of spaced metallic teeth, each of said teeth extending horizontally and transversely to the direction of movement of the associated platform, each of said racks being of substantial length relative to the length of its associated platform in the direction of movement thereof, an endless resilient belt disposed within the loop of said articulated belt and having teeth intermeshing with the teeth of the racks of a plurality of said platforms, said resilient belt being oriented to develop forces directed vertically upward on the last-named platforms, and motive means operable for driving said resilient belt, said motive means including a metallic gear having teeth for moving said resilient belt being disposed to have said teeth thereof intermesh with the teeth of said gear.

13. In a conveyor for carrying load, a structure having first and second horizontally spaced landings, an articulated belt comprising an endless series of similar platforms and having a load transporting run and a return run, and means for moving said articulated belt in a closed path with said load transporting run extending between said landings, said means comprising a metallic rack secured to the underside of each of said platforms during said load transporting run, each of said racks comprising spaced teeth, each of said teeth extending horizontally and transversely to the direction of movement of the associated platform, an endless resilient belt disposed within the loop of said articulated belt, said resilient belt having outwardly facing teeth adapted to intermesh with the teeth of said racks, motive means operable for driving said resilient belt, said motive means including a gear having teeth adapted to intermesh with said teeth of said resilient belt, and roller means disposed within the loop of said resilient belt for guiding said resilient belt in a predetermined path to effect the intermeshing of said teeth thereof with the teeth of the racks of a plurality of said platforms and with the teeth of said gear.

14. In a conveyor for carrying load, a structure having first and second spaced landings, an articulated belt comprising an endless series of similar platforms and having a load transporting run and a return run, and means for moving said articulated belt in a closed path with said load transporting run extending between said landings, said means comprising first and second spaced toothed racks each secured to the underside of each of said platforms during said load transporting run, each of said racks extending in the direction of movement of the associated platform, each of said first racks being aligned with the first rack of each of the other platforms, each of said second racks being aligned with the second rack of each of the other platforms, a first endless resilient belt having teeth intermeshing with the teeth of the first racks of a plurality of said platforms, a second endless resilient belt having teeth intermeshing with the teeth of the second racks of a plurality of said platforms, motive means operable for driving said first and second resilient belts in synchronism, and means responsive to a discontinuity in either of said first and second belts for rendering said motive means inoperable to drive the other of said first and second belts.

15. In a conveyor for carrying load, a structure having first and second spaced landings, an articulated belt comprising an endless series of similar platforms and having a load transporting run and a return run, and means for moving said articulated belt in a closed path with said load transporting run extending between said landings, said means comprising first and second toothed racks each secured to the underside of each of said platforms during said load transporting run, said first and second racks of each platform being spaced in a direction transverse to the direction of movement thereof, each of said racks extending in the direction of movement of the associated platform, each of said first racks being aligned with the first rack of each of the other platforms, each of said second racks being aligned with the second rack of each of the other platforms, a first endless resilient belt having teeth intermeshing with the teeth of the first racks of a plurality of said platforms, a second endless resilient belt having teeth intermeshing with the teeth of the second racks of a plurality of said platforms, and motive means operable for driving said first and second resilient belts in synchronism.

16. A platform for a moving walk, said platform comprising a body having a top tread surface disposed substantially in a first plane, and a pair of substantially identical, spaced, generally U-shaped support links, each of said links comprising a pair of spaced legs and a portion joining said legs, each of the legs or said links being secured to the bottom of said body, a first end of each of said legs being extended and configured to form first bearing means disposed adjacent a first end of said body, the second end of each of said legs opposite said first end being extended and configured to form second bearing means disposed adjacent a second end of said body opposite said first body end, all of said first bearing means being aligned and disposed to define a first axis, all of said second bearing means being aligned and disposed to define a second axis parallel to said first axis, said first and second axes lying in a second plane parallel to said first plane, one pair of said first and second ends of the legs of each of said links being spaced by a distance equal to at least the spacing between the respective outer surfaces of the opposite pair thereof, said first body end having a generally concave cylindrical surface curved about said first axis, said second body end having a generally convex cylindrical surface curved about said second axis, said convex cylindrical surface having a radius of curvature slightly less than the radius of curvature of said concave cylindrical surface.

17. A platform for a moving walk, said platform comprising a body having a plurality of spaced parallel cleats extending thereacross, each of said cleats having an exposed surface, said exposed cleat surfaces being disposed substantially in a plane to form a top platform tread surface, and a pair of substantially identical, spaced, generally U-shaped support links, each of said links comprising a pair of spaced legs and a portion joining said legs, each of the legs of said links being secured to the bottom of said body, a first end of each of said legs being extended and configured to form first bearing means disposed adjacent a first end of said body, the second end of each of said legs opposite said first end being extended and configured to form second bearing means disposed adjacent a second end of said body opposite said first body end, all of said first bearing means being aligned and disposed to define a first axis extending transversely of said cleats, all of said second bearing means being aligned and disposed to define a second axis parallel to said first axis, said first and second axes lying in a second plane parallel to said first plane, one pair of said first and second ends of the legs of each of said links being spaced by a distance equal to at least the spacing between the respective outer surfaces of the opposite pair thereof, said first body end having a generally concave cylindrical surface curved about said first axis, said second body end having a generally convex cylindrical surface curved about said second axis, said convex cylindrical surface having a radius of curvature slightly less than the radius of curvature of said concave cylindrical surface.

18. A platform for a moving walk, said platform comprising a body having a top tread surface disposed substantially in a first plane, and a pair of substantially identical, spaced, generally U-shaped support links, each of said links comprising a pair of spaced legs and a portion joining said legs, each of the legs of said links being secured to the bottom of said body, a first end of each of said legs being extended and configured to form first bearing means disposed adjacent a first end of said body, the second end of each of said legs opposite said first end being extended and configured to form second bearing means disposed adjacent a second end of said body opposite said first body end, all of said first bearing means being aligned and disposed to define a first axis, all of said second bearing means being aligned and disposed to define a second axis parallel to said first axis, said first and second axes lying in a second plane parallel to said first plane, one pair of said first and second ends of the legs of each of said links being spaced by a distance equal to at least the spacing between the respective outer surfaces of the opposite pair thereof, said first body end having a generally concave cylindrical surface curved about said first axis, said second body end having a generally convex cylindrical surface curved about said second axis, said convex cylindrical surface having a radius of curvature slightly less than the radius of curvature of said concave cylindrical surface, and a rack secured to each of said link portions joining said legs thereof, each of said racks comprising a plurality of spaced teeth, each of said teeth extending parallel to said first and second axes.

19. In a conveyor for carrying load, a structure having first and second spaced landings, an articulated belt comprising an endless series of similar platforms and having a load transporting run and a return run, and means for moving said articulated belt in a closed path with said load transporting run extending between said landings, and a balustrade disposed adjacent a side of said belt and extending from said first to said second landing, each of said platforms being spaced from and extending beneath said balustrade and having a groove in the upper surface thereof and adjacent said balustrade during said load transporting run, said grooves extending in the direction of platform movement, the groove of each platform being aligned with the groove of each of the other platforms, said balustrade having a flexible lip extending for a substantial distance in the direction of spacing of said first and second landings, said lip projecting into the groove of each platform while such platform is adjacent said lip on said load transporting run to close the space between the balustrade and such adjacent platform.

20. In a conveyor for carrying load, a structure having first and second spaced landings, an articulated belt having a load transporting run and a return run, motive means for moving the belt in a closed path with said load transporting run extending between said landings, said belt comprising an endless series of susbtantially identical rigid platforms including first and second adjacent platforms, means mounting said first and second adjacent platforms for independent rotation about a common horizontal axis extending transversely to the direction of movement of said belt, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, and a balustrade disposed adjacent a side of said belt and extending from said first to said second landing, said platforms being spaced from and extending beneath said balustrade, said balustrade having a flexible lip projecting into the space between two adjacent cleats of each platform during said load transporting run to close the space between the balustrade and such platform.

21. In a moving walk for carrying passengers, a structure having a first landing and a second landing horizontally and vertically spaced from the first landing, an articulated belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of substantially identical rigid platforms including first and second adjacent platforms, and means common to said first and second adjacent platforms mounting such platforms adjacent said adjacent end portions for movement in said path and for rotation of said first platform relative to said adjacent second platform about a common horizontal axis during transition of said first and second platforms between each of said passenger transporting run horizontal portions and said passenger transporting run inclined portion, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, and a balustrade disposed adjacent a side of said belt and extending from said first to said second landing, said platforms being spaced from and extending beneath said balustrade, said balustrade having a flexible lip portion extending for a substantial distance in the direction of spacing of said first and second landings adjacent each of said passenger transporting run transition portions, each of said lip portions projecting into the space between two adjacent cleats of each platform while such platform is adjacent such lip portion on said passenger transporting run to close the space between the balustrade and such adjacent platform.

22. In a conveyor for carrying load, a structure having first and second spaced landings, an articulated belt having a load transporting run and a return run, motive means for moving the belt in a closed path with said load transporting run extending between said landings, said belt comprising an endless series of susbtantially identical rigid platforms including first and second adjacent platforms having adjacent respective end portions extending between the sides of the associated platform, means mounting said first and second adjacent platforms for independent rotation about a common horizontal axis extending transversely to the direction of movement of said belt, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, said end portion of said first platform being concavely curved about said axis, said end portion of said second platform being convexly curved about said axis, said curved end portion of said first platform overlapping said adjacent curved end portion of said second platform throughout the movement of said first and second platforms between said landings on said load transporting run, the adjacent ends of alternate ones of the cleats of said first and second platforms at said adjacent curved end portions being reciprocally staggered to intermesh throughout the movement of said first and second platforms between said landings on said load transporting run.

23. In a conveyor for carrying load, a structure having first and second spaced landings, an articulated belt having a load transporting run and a return run, motive means for moving the belt in a closed path with said load transporting run extending between said landings, said belt comprising an endless series of susbtantially identical rigid platforms including first and second adjacent platforms having adjacent respective end portions extending between the sides of the associated platform, means mounting said first and second adjacent platforms for independent rotation about a common horizontal axis extending transversely to the direction of movement of said belt, each of said platforms comprising a treadboard having a base portion and a plurality of spaced cleats carried by said base portion for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, said end portion of said first platform being concavely curved about said axis, said end portion of said second platform being convexly curved about said axis, said curved end portion of said first platform overlapping said adjacent curved end portion of said second platform throughout the movement of said first and second platforms between said landings on said load transporting run, the adjacent ends of alternate ones of the cleats of said first and second platforms at said adjacent curved end portions being reciprocally staggered, said end portion of said first platform including spaced treadboard base portion first teeth projecting toward said end portion of said second platform, said end portion of said second platform including spaced treadboard base portion second teeth projecting toward said end portion of said first platform, each of alternate ones of the ends of the cleats of said first platform at its concavely curved end portion merging into one of said treadboard base portion first teeth, each of alternate ones of the ends of the cleats of said second platform at its convexly curved end portion merging into one of said treadboard base portion second teeth, each of said first and second teeth being wider than its associated cleat, said first and second treadboard teeth being reciprocally staggered, said reciprocally staggered cleat ends and treadboard teeth of the concavely curved end portion of said first platform and of the adjacent convexly curved end portion of said second platform respectively intermeshing throughout the movement of said first and second platforms between said landings on said load transporting run.

24. In a moving walk for carrying passengers, a structure having a first landing and a second landing horizontally and vertically spaced from the first landing, an articulated belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of substantially identical rigid platforms including first and second adjacent platforms having adjacent respective end portions extending between the sides of the associated platform, a pair of rollers for common support of said first and second adjacent platforms, axle means mounting said rollers on such platforms adjacent said adjacent end portions for rotation about a common horizontal axis extending transversely to the direction of movement of said belt, one roller of said pair being disposed outwardly of one side of said belt, the other roller of said pair being disposed outwardly of the opposite side of said belt, said first and second adjacent platforms being independently rotatable about the axis of rotation of their associated pair of rollers, and track means for guiding said rollers to move said platforms in said path whereby said first platform rotates relative to said second platform about said axis of rotation during transition of said first and second platforms between each of said passenger transporting run horizontal portions and said passenger transporting run inclined portion, each of said platforms comprising a treadboard having a base portion and a plurality of spaced cleats carried by said base portion for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, said end portion of said first platform being concavely curved about said axis, said end portion of said second platform being convexly curved about said axis, said curved end portion of said first platform overlapping said adjacent curved end portion of said second platform throughout the movement of said first and second platforms between said landings on said load transporting run, the adjacent ends of alternate ones of the cleats of said first and second platforms at said adjacent curved end portions being reciprocally staggered, said end portion of said first platform including spaced treadboard base portion first teeth projecting toward said end portion of said second platform, said end portion of said second platform including spaced treadboard base portion second teeth projecting toward said end portion of said first platform, each of alternate ones of the ends of the cleats of said first platform at its concavely curved end portion merging into one of said treadboard base portion first teeth, each of alternate ones of the ends of the cleats of said second platform at its convexly curved end portion merging into one of said treadboard portion second teeth, each of said first and second teeth being wider than its associated cleat, said first and second treadboard teeth being reciprocally staggered, said reciprocally staggered cleat ends and treadboard teeth of the concavely curved end portion of said first platform and of the adjacent convexly curved end portion of said second platform respectively intermeshing throughout the movement of said first and second platforms between said landings on said load transporting run.

25. A treadboard for a moving walk, said treadboard comprising a base portion and a plurality of spaced parallel cleats carried by and extending longitudinally across said base portion, each of said cleats having an exposed upper surface, said exposed cleat surfaces being disposed substantially in a first plane to form a top tread surface, a first end of each of said cleats being concavely curved about a first common axis adjacent thereto, the second end of each of said cleats opposite said first end being convexly curved about a second common axis adjacent thereto, said first and second axes being parallel and lying in a second plane parallel to said first plane and beneath said treadboard, said first and second ends of alternate ones of said cleats being reciprocally staggered, the radius of curvature of said second end of each of said cleats being slightly less than the radius of curvature of said first end of such cleat.

26. A treadboard for a moving walk, said treadboard comprising a base portion and a plurality of spaced parallel cleats carried by and extending longitudinally across said base portion, each of said cleats having an exposed upper surface, said exposed cleat surfaces being disposed substantially in a first plane to form a top tread surface, a first end of each of said cleats being concavely curved about a first common axis adjacent thereto, the second end of each of said cleats opposite said first end being convexly curved about a second common axis adjacent thereto, said first and second axes being parallel and lying in a second plane parallel to said first plane and beneath said treadboard, said first axis being disposed outwardly of said first ends of said cleats, said second axis being disposed inwardly of said second ends of said cleats, said first end of each of alternate ones of said cleats having a first radius of curvature, said first end of each of said cleats intermediate said alternate ones having a second radius of curvature greater than said first radius, said second end of each of said alternate cleats having a third radius of curvature slightly less than said first radius, said second end of each of said intermediate cleats having a fourth radius of curvature greater than said third radius and slightly less than said second radius.

27. A treadboard for a moving walk, said treadboard comprising a base portion and a plurality of spaced parallel cleats carried by and extending longitudinally across said base portion, each of said cleats having an exposed upper surface, said exposed cleat surfaces being disposed substantially in a first plane to form a top tread surface, a first end of each of said cleats being concavely curved about a first common axis adjacent thereto, the second end of each of said cleats opposite said first end being convexly curved about a second common axis adjacent thereto, said first and second axes being parallel and lying in a second plane parallel to said first plane and beneath said treadboard, said first axis being disposed outwardly of said first ends of said cleats, said second axis being disposed inwardly of said second ends of said cleats, said first end of each of alternate ones of said cleats having a first radius of curvature, said first end of each of said cleats intermediate said alternate ones having a second radius of curvature greater than said first radius, said second end of each of said alternate cleats having a third radius of curvature slightly less than said first radius, said second end of each of said intermediate cleats having a fourth radius of curvature greater than said third radius and slightly less than said second radius, said treadboard base portion having a first outwardly projecting tooth aligned with said first end of each of said alternate cleats and a second outwardly projecting tooth aligned with said second end of each of said intermediate cleats, each of said teeth being wider than its associated cleat end.

References Cited by the Examiner
UNITED STATES PATENTS

| | | | |
|---|---|---|---|
| 963,176 | 7/10 | Reno | 198—16 |
| 1,112,836 | 10/14 | Reno | 198—16 |

SAMUEL F. COLEMAN, *Primary Examiner.*

WILLIAM B. LA BORDE, *Examiner.*